(12) United States Patent
West

(10) Patent No.: US 9,075,189 B2
(45) Date of Patent: Jul. 7, 2015

(54) METHOD FOR OBTAINING OPTICAL ARTICLES HAVING SUPERIOR ABRASION RESISTANT PROPERTIES, AND COATED ARTICLES PREPARED ACCORDING TO SUCH METHOD

(75) Inventor: Karen West, St. Petersburg, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 14/126,297

(22) PCT Filed: Jun. 13, 2011

(86) PCT No.: PCT/US2011/040201
§ 371 (c)(1),
(2), (4) Date: Dec. 13, 2013

(87) PCT Pub. No.: WO2012/173596
PCT Pub. Date: Dec. 20, 2012

(65) Prior Publication Data
US 2014/0125945 A1    May 8, 2014

(51) Int. Cl.
*G02C 3/00* (2006.01)
*G02C 7/16* (2006.01)
*G02B 1/10* (2015.01)
*B29D 11/00* (2006.01)
*G02B 1/04* (2006.01)

(52) U.S. Cl.
CPC .......... *G02B 1/105* (2013.01); *B29D 11/00865* (2013.01); *G02B 1/043* (2013.01)

(58) Field of Classification Search
CPC .. C04B 41/0072; C04B 41/505; C04B 41/91; A01N 59/16; A01N 59/20; A01N 25/08; A01N 25/34; A01N 2300/00; A01N 25/10; A01N 59/02; B32B 27/08; B32B 2250/40; B32B 7/12; B32B 2250/03; B32B 37/24; B32B 2037/243; B32B 2250/02
USPC .......... 351/159.57, 159.01, 41, 227; 359/885; 525/452; 428/423.1, 213, 212, 98, 214, 428/446, 411.11, 204, 427, 447
See application file for complete search history.

(56) References Cited

U.S. PATENT DOCUMENTS

| 5,597,622 A | 1/1997 | Zoller et al. ................. 427/563 |
| 8,591,026 B2 * | 11/2013 | Conte et al. ............ 351/159.57 |
| 2008/0213473 A1 | 9/2008 | Roisin et al. ................. 427/162 |

FOREIGN PATENT DOCUMENTS

| GB | 1 591 064 | | 6/1981 |
| GB | 1591064 A | * | 6/1981 |
| JP | 60-202401 | | 10/1985 |
| JP | 5-173002 | | 7/1993 |
| WO | WO 2009/004222 | | 1/2009 |

OTHER PUBLICATIONS

International Search Report and Written Opinion issued in PCT Application No. PCT/US2011/040201, mailed Mar. 20, 2012.
International Preliminary Report on Patentability issued in PCT Application No. PCT/US2011/040201, mailed Jan. 3, 2014.

* cited by examiner

*Primary Examiner* — Thomas K Pham
*Assistant Examiner* — Sharrief Broome
(74) *Attorney, Agent, or Firm* — Norton Rose Fulbright US LLP

(57) ABSTRACT

A method for preparing an abrasion resistant optical article comprising: providing an optical article having at least one main face bearing an abrasion resistant coating; positioning said optical article in a vacuum deposition chamber; depositing a first inorganic layer comprising $SiO_2$ onto and in direct contact with said abrasion resistant coating by vacuum evaporation of $SiO_2$ and/or $SiO_x$, with $1<x<2$, in said vacuum chamber, the thickness of said first inorganic layer ranging from 10 to 100 nm, wherein oxygen is introduced inside said vacuum chamber during said evaporation; said deposition being conducted without ion assistance; depositing a second inorganic layer comprising $SiO_2$ onto and in direct contact with said first inorganic layer by vacuum evaporation of $SiO_2$ and/or $SiO_x$, with $1<x<2$, in said vacuum chamber, the thickness of said second inorganic layer ranging from 70 to 300 nm, wherein said deposition is conducted without ion assistance and the pressure in said vacuum chamber during the deposition of said second inorganic layer being lower than the pressure during evaporation of said first inorganic layer and optionally; applying onto and in direct contact with said second inorganic layer a hydrophilic or an antifouling hydrophobic layer, preferably having a thickness ranging from 1 to 15 nm, wherein the outermost layer of the article is said second inorganic layer, or, when present, said hydrophilic or hydrophobic layer.

9 Claims, No Drawings

METHOD FOR OBTAINING OPTICAL ARTICLES HAVING SUPERIOR ABRASION RESISTANT PROPERTIES, AND COATED ARTICLES PREPARED ACCORDING TO SUCH METHOD

CROSS-REFERENCE TO RELATED APPLICATIONS

This application is a national phase application under 35 U.S.C. §371 of International Application No. PCT/US2011/040201 filed 13 Jun. 2011, the entire contents of which is specifically incorporated herein by reference without disclaimer.

BACKGROUND OF THE INVENTION

1. Field of the Invention

The present invention relates to a method for the preparation of optical articles having improved abrasion resistance compared to optical articles of the prior art.

The invention also relates to a method for the preparation of abrasion resistant optical articles bearing an upper layer having hydrophobic or hydrophilic properties, leading in the latter case to antifogging articles upon an appropriate treatment.

The invention also relates to optical articles, especially ophthalmic lenses for spectacles obtained by the method of the invention.

2. Description of Related Art

Abrasion resistance of optical articles, especially ophthalmic lenses for eyeglasses, has always been an important technical problem, especially for organic lenses, whose surfaces are more prone to scratching and abrasion than inorganic lenses.

A technical solution described in the prior art is to apply a hard inorganic layer at the surface of the organic lens.

JP05173002 describes a bi-layer system: one first very thick layer (1,500 nm to 2,000 nm) obtained by evaporation of SiO under partial pressure of oxygen and, deposited thereon, a $SiO_2$ or $MgF_2$ layer, which is not limited in thickness but whose thickness generally ranges from 80 to 120 nm.

The first thick $SiO_2$ layer is formed under an oxygen partial pressure, typically $2.10^{-4}$ torr ($2.7 \times 10^{-4}$ mbar) of oxygen. The partial pressure and deposition rate of this first layer are controlled in such a manner that the difference of refractive index between the optical part and the SiO reaction vapour deposition film is within +/−0.5%. According to JP05173002, the deposition of the second layer prevents reflection.

Good abrasion and adhesion resistance of the film are obtained.

The above bi-layer is directly deposited on the substrate itself (without conventional hard coating)

U.S. Pat. No. 5,597,622 relates to a process of providing a scratch resistant coating for a lens made of an organic material (such as made of CR39®). A very thin adhesion layer of SiO is applied first and is subsequently provided with a thick $SiO_2$ layer.

The first layer has a thickness of one molecule of SiO up to 20 nm and, as said previously, is used for improving adhesion.

The first SiO layer is obtained by vaporizing SiO and irradiating the substrate and the SiO layer being formed with a plasma.

A thickness of at least 500 nm for the second layer made of $SiO_2$ is necessary for the wearability. Indeed, U.S. Pat. No. 5,597,622 patent discloses that thinner SiO2 layers break down even if they are very hard.

Numerous patents have disclosed the use of abrasion resistant coating compositions that can be defined as hybrid layers, i.e. they have organic/inorganic properties. They are generally obtained by hydrolysis and condensation of organic alkoxysilanes, especially epoxyalkoxysilanes providing a highly cross-linked matrix.

Generally such coatings contain also a relatively high amount of inorganic fillers such as colloidal silica and/or colloidal metal oxides.

Other classically used coatings are (meth)acrylic coatings that can be organic coatings or hybrid coatings, if containing the same kind of fillers previously described.

As (meth)acrylic coatings are very hard as such, they are often used without inorganic fillers.

The usual thickness of such coatings ranges from 1 to 5 microns.

The above abrasion resistant coatings might be used in combination with anti-reflective (AR) stacks deposited thereon. These AR stacks are generally made of alternated high refractive index and low refractive index inorganic layers, deposited under vacuum (physical vapour deposition, chemical vapour deposition (CVD), optionally under plasma assistance (PECVD).

The use of an inorganic sublayer applied between a substrate bearing an abrasion resistant coating and an AR stack is known in the art.

For instance, US 2008213473 discloses the use of a $SiO_2$ sublayer interposed between an abrasion resistant coating and an AR stack.

According to a main characteristic of the method disclosed in US2008213473, the exposed surface of the sub-layer is submitted to an ionic bombardment treatment before depositing the AR stack.

This treatment is typically conducted under vacuum, by using for example an argon ion beam generated by means of an ion gun. US2008213473 observed that such method makes it generally possible on one hand to improve the abrasion resistance properties of the whole antireflection coating and on the other to increase its adhesion properties, especially the adhesion of the multilayered stack to the sub-layer.

The sub-layer needs to be relatively thick, at least 75 nm, and its thickness generally ranges from 75 to 200 nm. US 2008213473 describes that the adhesion of the sublayer can be improved by introduction of a gas during the deposition of the sublayer, such as rare gas, oxygen or nitrogen.

The patent application WO2009004222 describes an ophthalmic lens having an AR stack deposited on a $SiO_2$ sublayer comprising two layers wherein a first layer is deposited without ion assistance and the second layer of said sublayer is deposited with ion assistance.

The above AR stacks, apart from the inorganic sublayer (that can itself be a composite one having multiple layers) comprise at least 4 mineral layers involving different materials having different internal stresses and the mechanical properties of the AR including adhesion and abrasion resistance are the result of a subtle balance between layers that are under compressive or tensive strength.

Generally, the consequence of depositing multiple inorganic layers on an abrasion resistant coating is to fragilize the whole stack, especially if a high number of inorganic layers is deposited on an abrasion resistant coating.

There is still a need in the art to obtain coatings having high abrasion resistant properties that are simple to prepare, and that are not used in combination with antireflective coatings, especially inorganic antireflective coatings.

Numerous patents have proposed technical solutions to improve the abrasion resistant properties of abrasion resistant coating by trying to modify the intrinsic properties of such coatings, for example in case of abrasion resistant sol/gel coatings, by using precursors increasing the degree of crosslinking of the abrasion resistant coating matrix or by using specific curing catalytic systems.

A first aim of this invention is to provide an optical article, having improved abrasion resistant properties compared to the prior art.

Another aim of this invention is to provide an optical article having improved abrasion resistance starting from an optical article already coated with an abrasion resistant coating without intrinsically modifying such abrasion resistant coating.

SUMMARY OF THE INVENTION

Therefore, a first object of the invention is to provide a process for obtaining an abrasion resistant optical article having improved abrasion resistance.

Especially, the process used to obtain abrasion resistant optical articles is simple and can be applied on any article already coated with an abrasion resistant coating.

To achieve the foregoing objects, there is provided a process for preparing an abrasion resistant optical article comprising:

a) providing an optical article having at least one main face bearing an abrasion resistant coating;

b) positioning said optical article in a vacuum deposition chamber;

c) depositing a first inorganic layer comprising $SiO_2$ onto and in direct contact with said abrasion resistant coating by evaporation of $SiO_2$ and/or $SiO_x$, with $1 \leq x < 2$ under vacuum in said vacuum chamber, the thickness of said first inorganic layer ranging from 10 to 30 nm, wherein oxygen is introduced inside said vacuum chamber during said evaporation; said deposition being conducted without ion assistance;

d) depositing a second inorganic layer comprising $SiO_2$ onto and in direct contact with said first inorganic layer by evaporation of $SiO_2$ and/or $SiO_x$, with $1 \leq x < 2$ under vacuum in said vacuum chamber, the thickness of said second inorganic layer ranging from 70 to 150 nm, wherein said deposition is conducted without ion assistance, the pressure during the deposition of said second inorganic layer being lower than the pressure during evaporation of said first inorganic layer and optionally e) applying onto and in direct contact with said second inorganic layer a hydrophilic or hydrophobic layer having a thickness ranging from 1 to 15 nm.

According to the invention, the second inorganic layer will be the outermost layer of the stack, i.e. the layer in contact with air if no additional layer is applied in step e).

If step e) is implemented, the additional layer (hydrophilic or hydrophobic) will become the outermost layer of the stack, in contact with air.

The invention also relates to articles having abrasion resistant coatings obtained by the process of the invention.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When the optical article comprises one or more surface coatings, the term "to deposit a layer onto the optical article" means that a layer is deposited onto the outermost coating of the optical article.

The outer layer in a coating stack is the layer that is the closest to the air, before deposition of another coating(s).

A layer is said to be in direct contact with another layer when 1) no interleaved layer is present between the two layers, or
2) only a very thin layer, i.e. less than 5 nm thickness, better less than 2 nm thickness is interleaved between the two layers.

The preferred meaning of direct contact is that there is no interleaved layer between the two respective layers.

In the context of the invention, an inorganic layer has to be understood as a layer that contains less than 5% by weight of carbon, preferably less than 2% by weight of carbon, better less than 1% and optimally contains no carbon.

The optical article bearing an abrasion resistant coating is preferably a lens, more preferably an ophthalmic lens or lens blank for spectacles.

Herein, the term "lens" means an organic or inorganic glass lens, preferably an organic lens, comprising a lens substrate which may be coated with one or more coatings of various natures.

The method of the invention can be used for manufacturing optical articles coated on their convex main side (front side), concave main side (back side), or both sides.

As used herein, the concave face or "rear face" or back side of the optical article means the face which, is located the nearest to the users eye. On the contrary, the "front face" (typically convex) of the substrate, means the face which, in the final article, is the most distant from the users eye.

According to the method of the invention, an optical article already bearing an abrasion resistant coating is first provided.

By definition, an abrasion resistant coating is a coating which improves the abrasion resistance of the optical article as compared to a same optical article but without the abrasion resistant coating.

The abrasion resistant coating composition can be a UV and/or a thermal curable composition.

In a preferred embodiment of the present invention, the abrasion resistant coating of the optical article is a sol-gel coating. The term "sol-gel" refers to materials undergoing a series of reactions, including hydrolysis and condensation and going through the sol to gel transition. Typically, a metal compound, such as a metal alkoxide or metal salt, hydrolyzes to form a metal hydroxide. The metal hydroxides then condense in solution to form a hybrid organic/inorganic polymer. Under certain conditions, these polymers condense to form a network gel.

Preferred sol-gel abrasion resistant coatings are silicon based coatings, which may be obtained by curing a precursor composition containing silanes or hydrolyzates thereof. The sol-gel silicon based coating compositions of the present invention are homogeneous mixtures of a solvent, a silane and/or an organosilane, and optionally a catalyst which are processed to form a coating suitable for optical application. The term "homogeneous" as used herein refers to a form which has a uniform or similar structure throughout and is given the ordinary meaning known to persons skilled in the art.

In a preferred embodiment of the invention, the abrasion resistant curable coating composition comprises at least one compound of formula:

$$R_nSi(X)_{4-n} \quad (I)$$

or a hydrolyzate thereof, in which the R groups are identical or different and represent monovalent organic groups linked to the silicon atom through a carbon atom, the X groups are identical or different and represent hydrolyzable groups and n is an integer equal to 1 or 2.

Organosilanes of formula I bear two or three X groups directly linked to the silicon atom, each leading to an OH group upon hydrolysis and one or two monovalent organic R groups linked to the silicon atom. It is worth noting that SiOH bonds may be initially present in the compounds of formula I, which are considered in this case as hydrolyzates. Hydrolyzates also encompass siloxane salts.

The X groups may independently and without limitation represent alkoxy groups —O—$R^1$, wherein $R^1$ preferably represents a linear or branched alkyl or alkoxyalkyl group, preferably a $C_1$-$C_4$ alkyl group, acyloxy groups —O—C(O)$R^3$, wherein $R^3$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example the NHSiMe$_3$ group, alkylenoxy groups such as the isopropenoxy group.

The X groups are preferably alkoxy groups, in particular methoxy, ethoxy, propoxy or butoxy, more preferably methoxy or ethoxy. In this case, compounds of formula I are alkoxysilanes.

In one embodiment of the invention, the silanes of formula I bear at least one R group containing at least one polymerizable function. Such silanes include, but are not limited to epoxysilanes, unsaturated organosilanes such as allylsilanes, vinylsilanes acrylic silanes, methacrylic silanes, preferably comprising a terminal ethylenic double bond.

Among compounds of formula I, a preferred class of compounds includes compounds of formula:

$$R_nY_mSi(X)_{4-n'-m} \quad (II)$$

or hydrolyzates thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups, m and n' are integers such that m is equal to 1 or 2 and n'+m=1 or 2.

The integers n and m define three groups of compounds II: compounds of formula RYSi(X)$_2$, compounds of formula Y$_2$Si(X)$_2$, and compounds of formula YSi(X)$_3$. Among these compounds, epoxysilanes having the formula YSi(X)$_3$ are preferred.

The monovalent R groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group.

The most preferred R groups are alkyl groups, in particular $C_1$-$C_4$ alkyl groups, and ideally methyl groups.

The monovalent Y groups linked to the silicon atom through a Si—C bond are organic groups since they contain at least one epoxy function, preferably one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

The preferred Y groups are groups of formulae III and IV:

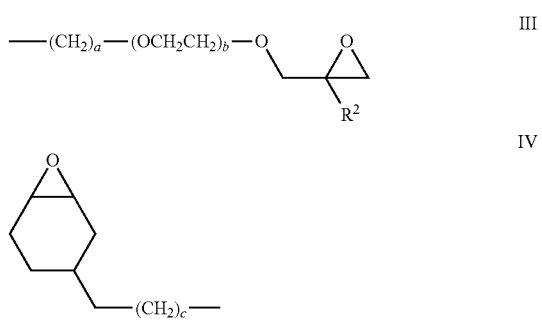

in which $R^2$ is an alkyl group, preferably a methyl group, or a hydrogen atom, ideally a hydrogen atom, a and c are integers ranging from 1 to 6, and b is 0, 1 or 2.

The preferred group having formula III is the γ-glycidoxypropyl group ($R^2$=H, a=3, b=0) and the preferred (3,4-epoxycyclohexyl)alkyl group of formula IV is the β-(3,4-epoxycyclohexyl)ethyl group (c=1). The γ-glycidoxyethoxypropyl group may also be employed ($R^2$=H, a=3, b=1).

Preferred epoxysilanes of formula II are epoxyalkoxysilanes, and most preferred are those having one Y group and three alkoxy X groups. Particularly preferred epoxytrialkoxysilanes are those of formulae V and VI:

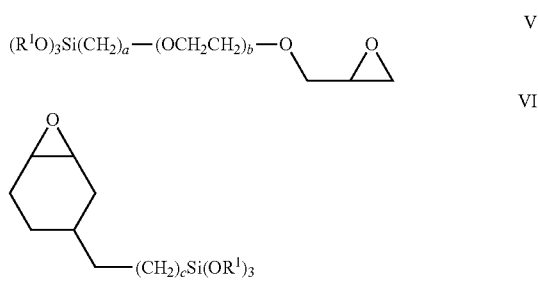

in which R$^1$ is an alkyl group having 1 to 6 carbon atoms, preferably a methyl or ethyl group, and a, b and c are such as defined above.

Examples of such epoxysilanes include but are not limited to γ-glycidoxy methyl trimethoxysilane, γ-glycidoxy methyl triethoxysilane, γ-glycidoxy methyl tripropoxysilane, γ-glycidoxy ethyl trimethoxysilane, γ-glycidoxy ethyl triethoxysilane, γ-glycidoxy ethyl trimethoxysilane, γ-glycidoxy ethyl triethoxysilane, γ-glycidoxy ethyl tripropoxysilane, γ-glycidoxy propyl trimethoxysilane, γ-glycidoxy propyl triethoxysilane, γ-glycidoxy propyl tripropoxysilane, γ-glycidoxy propyl trimethoxysilane, γ-glycidoxy propyl triethoxysilane, γ-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl) ethyltrimethoxysilane, 2-(3,4-epoxycyclohexyl) ethyltriethoxysilane. Other useful epoxytrialkoxysilanes are described in U.S. Pat. No. 4,294,950, U.S. Pat. No. 4,211,823, U.S. Pat. No. 5,015,523, EP 0614957 and WO 94/10230, which are hereby incorporated by reference. Among those silanes, γ-glycidoxypropyltrimethoxysilane (GLYMO) is preferred.

The content of the theoretical dry extract of compound I in the abrasion resistant coating composition is generally ranging from 20 to 80%, preferably 25 to 60% by weight, based on the total weight of the theoretical dry extract.

The theoretical dry extract weight of a composition is defined as the sum of the theoretical dry extract weights of each of its components. As used herein, the theoretical dry extract weight of compounds of formula I or II is the calculated weight in $R_nSi(O)_{(4-n)/2}$ or $R_nY_mSi(O)_{(4-n'-m)/2}$ units, wherein R, Y, n, n' and m are such as defined previously.

The presence of an epoxyalkoxysilane is preferred in the composition of the abrasion resistant coating. It provides a highly crosslinked matrix.

In some embodiments, the hard coat composition comprises fillers, generally nanoparticles (or nanocrystals), for increasing the hardness and/or the refractive index of the cured coating. The nanoparticles may be organic or inorganic. A mixture of both can also be used. Preferably, inorganic nanoparticles are used, especially metallic or metalloid oxide.

By "nanoparticles", it is meant particles which diameter (or longest dimension) is lower than 1 µm, preferably lower than 150 nm and still better lower than 100 nm. In the present invention, fillers or nanoparticles preferably have a diameter ranging from 2 to 100 nm, more preferably from 2 to 50 nm, and even better from 5 to 50 nm.

Suitable inorganic nanoparticles are for example nanoparticles of aluminum oxide $Al_2O_3$, silicon oxide $SiO_2$, zirconium oxide $ZrO_2$, titanium oxide $TiO_2$, antimony oxide $Sb_2O_5$, tantalum oxide $Ta_2O_5$, zinc oxide, tin oxide $SnO_2$, indium oxide, cerium oxide, $Si_3N_4$, or their mixtures.

It is also possible to use particles of mixed oxides or composite particles, for example those having a core/shell structure. Using different types of nanoparticles allows making hetero-structured nanoparticles layers.

Preferably, the nanoparticles are particles of aluminum oxide, tin oxide, zirconium oxide or silicon oxide $SiO_2$, more preferably $SiO_2$ nanoparticles. Mineral fillers are preferably used under colloidal form, i.e. under the form of fine particles dispersed in a dispersing medium such as water, an alcohol, a ketone, an ester or mixtures thereof, preferably an alcohol The curable composition of the invention optionally comprises a catalytic amount of at least one curing catalyst, so as to accelerate the curing step.

Examples of curing catalysts are aluminum acetylacetonate, carboxylates of metals such as zinc, titanium, zirconium, tin or magnesium.

Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" $2^{eme}$ edition, C. A. May (Ed.), Marcel Dekker, New York, 1988.

In another embodiment, the abrasion resistant coating may be a (meth)acrylate based coating, which is typically UV-curable. The term (meth)acrylate means either methacrylate or acrylate. The coating may be especially obtained from a mixture of an acrylate and an epoxy monomer. Usable polyepoxy monomers are disclosed for example in US2007/0275171 and U.S. Pat. No. 6,984,262, which are incorporated herein by reference.

The main component of the (meth)acrylate based curable coating composition may be chosen from monofunctional (meth)acrylates and multifunctional (meth)acrylates such as difunctional (meth)acrylates; trifunctional (meth)acrylates; tetrafunctional (meth)acrylates, pentafunctional (meth)acrylates, hexafunctional (meth)acrylates.

Examples of monomers which may be used as main components of (meth)acrylate based coating compositions are:

monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.

difunctional (meth)acrylates: 1,4-butanediol diacrylate, 1,4-butanediol dimethacrylate, 1,6-hexanediol diacrylate, 1,6-hexanediol dimethacrylate, ethoxylated bisphenol A diacrylate, polyethylene glycol di(meth) acrylates such as polyethylene glycol diacrylate, tetraethylene glycol diacrylate, polyethylene glycol dimethacrylate, polyethylene glycol diacrylate, tetraethylene glycol diacrylate, tripropylene glycol diacrylate, neopentyl glycol diacrylate, tetraethylene glycol dimethacrylate, diethylene glycol diacrylate.

trifunctional (meth)acrylates: Trimethylolpropane trimethacrylate, Trimethylolpropane triacrylate, pentaerythritol triacrylate, ethoxylated trimethylolpropane triacrylate, trimethylolpropane trimethacrylate.

tetra to hexa(meth)acrylates: Dipentaerythritol pentaacrylate, pentaerythritol tetraacrylate, ethoxylated pentaerythritol tetraacrylate, pentaacrylate esters.

The abrasion resistant coating composition may be deposited onto at least part of a main face of the substrate of the optical article, preferably onto said entire main face, by any of the methods used in coating technology such as, for example, spray coating, spin coating, flow coating brush coating, dip coating or roll-coating. Spin coating and dip coating are the preferred methods. The composition can also be applied by a series of successive layers or thin coats onto the substrate to achieve the desired thickness.

It is then cured by conventional technique (for example thermal or UV).

The abrasion resistant coatings have a thickness preferably ranging from 1 to 10 µm, more preferably from 2 to 5 µm, even better from 3 to 5 µm.

The substrate may be made of mineral glass or organic glass, preferably organic glass (polymer substrate). The organic glasses can be made of any material currently used for organic ophthalmic lenses, e.g., thermoplastic materials such as polycarbonates and thermoplastic polyurethanes or thermosetting (cross-linked) materials such as those obtained by polymerization of allyl derivatives such as the allyl carbonates of linear or branched aliphatic or aromatic polyols, such as diethylene glycol bis(allyl carbonate), isopropylene bisphenol-A bis(allyl carbonate), poly(meth)acrylates and copolymers based substrates, polythio(meth)acrylates, thermosetting polyurethanes, polythiourethanes, polyepoxides, polyepisulfides, as well as copolymers thereof and blends thereof.

Substrates particularly recommended are polycarbonates, for example those made from bisphenol-A polycarbonate, sold for example under the trade names LEXAN® by General Electric or MAKROLON® by Bayer AG, or those incorporating carbonate functional groups, in particular substrates obtained by polymerization or copolymerization of diethylene glycol bis(allyl carbonate), sold under the trade name CR-39® by PPG INDUSTRIES. By (meth)acrylate, it is meant an acrylate or methacrylate group.

Optionally, the substrate is coated with an impact-resistant primer coating. The impact-resistant primer coating which may be used in the present invention can be any coating typically used for improving impact resistance of a finished optical article. Also, this coating generally enhances adhesion, if present, of the abrasion resistant coating of the invention on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings. (Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Preferably the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names W-240 and W-234 by Baxenden Chemicals or Witcobond.

The impact-resistant primer coating composition can be simply dried or optionally pre-cured before molding of the optical substrate.

Thickness of the impact-resistant primer coating, after curing, typically ranges from 0.05 to 30 µm, preferably 0.5 to 20 µm and more particularly from 0.6 to 15 µm, and even better 0.6 to 5 µm and most preferably 0.6 to 1.2 microns.

According to the invention, the optical article bearing an abrasion resistant coating is positioned in a vacuum chamber.

Optionally, the surface of the article bearing the abrasion resistant coating onto which the first inorganic layer is deposited may be subjected to a physical or chemical pre-treatment step intended to improve adhesion, for example a high-frequency discharge plasma treatment, a glow discharge plasma treatment, a corona treatment, an electron beam treatment, an ion beam treatment (IPC: ion pre cleaning), a solvent treatment or an acid or base (NaOH) treatment.

Preferably an IPC treatment is implemented.

Then a first inorganic layer is applied by depositing a $SiO_2$ layer onto and in direct contact with the abrasion resistant coating by evaporating $SiO_2$ and/or $SiO_x$, preferably $SiO_2$, with $1 \leq x < 2$ under vacuum in said vacuum chamber, the thickness of said first inorganic layer ranging from 10 to 100 nm, more preferably 10 to 50 nm, better from 10 to 30 nm.

Oxygen gas ($O_2$) is introduced inside said vacuum chamber during said evaporation; said deposition being conducted without ion assistance. This gas supply, which makes it possible to increase the pressure, differs from an IAD (Ion assisted deposition) treatment, in which the layer does undergo an activated species beam bombardment such as with ions.

During the first deposition step of the method of the invention, there is no bombardment of the first inorganic layer by energetic species such as created by a plasma treatment, a corona treatment or by an ion gun.

As used herein, the "energetic species" are species defined as having an energy ranging from 1 to 150 eV, preferably from 10 to 150 eV, and more preferably from 40 to 150 eV. The energetic species may be chemical species such as ions, radicals or species like electrons.

Preferably, the pressure during deposition of the first $SiO_2$ layer is higher than or equal to $1 \times 10^{-4}$ mbar and is more preferably ranging from $1.2 \times 10^{-4}$ mbar to $5 \times 10^{-4}$ mbar.

Without being bound by a theory, the inventors believe that by increasing the gas pressure by introducing oxygen inside the vacuum chamber, the molecules in the formed first inorganic layer are more widely spaced from each others, thus resulting in a layer having a low level of density.

The deposition rate during deposition of the first layer preferably ranges from 0.2 to 0.5 nm/s.

The first inorganic layer comprising $SiO_2$ comprises at least 80% by weight of $SiO_2$, preferably at least 90% by weight of $SiO_2$, more preferably at least 95% by weight and even better 100% by weight of $SiO_2$.

Before applying the second layer of the invention, an activation treatment of the surface of the first inorganic layer can be implemented, for the purpose of improving adhesion, such as ion beam treatment, a corona or plasma treatment or an acidic or basic treatment.

In a preferred embodiment, no activation treatment is implemented before depositing the second inorganic layer and moreover there is no layer interleaved between the first and second inorganic layer.

Then a second inorganic layer comprising $SiO_2$ is deposited onto and in direct contact with said first inorganic layer by evaporation under vacuum of $SiO_2$ and/or $SiO_x$, with $1 \leq x < 2$, preferably $SiO_2$, in the vacuum chamber, the thickness of said second inorganic layer ranging from 70 to 300 nm, preferably 70 to 200 nm, more preferably 70 to 150 nm, even better from 70 to 100 nm, without introduction in the vacuum chamber of an additional gas such as oxygen gas, nitrogen gas, or inert gas such as rare gas and no treatment step (especially no ion assistance) with energetic species of the second inorganic layer comprising $SiO_2$ is conducted during its deposition.

The pressure inside said vacuum chamber during the deposition of said second inorganic layer is lower than the pressure during the previous step of deposition.

Preferably, the pressure inside said vacuum chamber during the deposition of the second inorganic layer ranges from $0.2 \times 10^{-4}$ to $0.5 \times 10^{-4}$ mbar.

The deposition rate during the deposition of the second layer preferably ranges from 0.7 to 1.3 nm/s.

In the two previously described deposition methods of the second inorganic layer comprising $SiO_2$, the resulting layer will have a higher density than the density of the first inorganic layer.

The second inorganic layer comprising $SiO_2$ comprises at least 80% by weight of $SiO_2$, preferably at least 90% by weight of $SiO_2$, more preferably at least 95% by weight and even better 100% by weight of $SiO_2$.

If no other layer is applied on said second inorganic layer, this second inorganic layer becomes the upper (outer) layer of the whole deposited stack and is then in direct contact with air.

At this stage, the so coated optical article has an improved abrasion resistance compared to the abrasion resistance of the initially coated optical article.

In a further optional step of the method of the invention, a hydrophilic layer or a hydrophobic layer, preferably having a thickness ranging from 1 to 15 nm, is applied onto and in direct contact with the second inorganic layer, and becomes the outermost layer of the whole stack, in contact with air.

The embodiment wherein the outermost layer is a hydrophilic layer will be now described in more details.

In the context of the invention, a hydrophilic layer is a layer having a static water contact angle of less than 50°.

Preferably, the hydrophilic layer has a static water contact angle lower than 45°, more preferably ≤40°, even better ≤30° and ideally ≤25°.

According to a first embodiment, a hydrophilic layer is deposited onto and in direct contact with the second inorganic layer by permanently grafting at least one organosilane compound having
- at least one polyoxyalkylene group, preferably comprising less than 80 carbon atoms, and
- at least one Si atom bearing at least one hydrolysable group.

This hydrophilic layer can act as a precursor layer of an anti-fog coating. In the context of the invention, a "precursor layer of an anti-fog coating" is a coating that acquires antifog properties when an appropriate liquid surfactant is applied on it and is adsorbed at its surface.

Preferably, the precursor layer of the antifog coating has a thickness lower than 5 nm, more preferably less than 4 nm and even better less than 3 nm and exhibits a static contact angle with water generally higher than 10° and lower than 50°.

Such a hydrophilic layer might be deposited under liquid form by a classical deposition method (spin or dip coating) or under vacuum, preferably by evaporation under vacuum.

If the hydrophilic layer is deposited by the liquid way, it is recommended to avoid a condensation of hydrolyzed organosilanes compounds so that they keep a maximum of free silanols groups in order to facilitate the grafting of such compounds at the surface of the optical article.

The organosilane compound is able, owing to its reactive group containing silicium, to create a covalent link with silanol groups at the surface of the second inorganic layer.

The preferred organosilane compound used to obtain the hydrophilic layer comprises a polyoxyalkylene chain functionalized at one or two of its terminal ends, preferably only at one end, by a group comprising at least one of one Si atom bearing at least one hydrolysable group.

This organosilane compound preferably comprises a Si atom bearing at least two, preferably three hydrolysable groups.

Preferably, it does not comprise urethane groups.

Preferably the organosilane compound has the following formula:

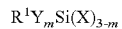

$$R^1Y_mSi(X)_{3-m}$$

(I')

wherein Y groups, identical or different, are organic monovalent groups linked to the silicium by a carbon atom. X groups, identical or different, are hydrolysable groups; $R^1$ is a group comprising a polyoxyalkylene function, m is an integer equal to 0, 1 ou 2. Preferably m=0.

The X groups are preferably chosen from the following groups: alkoxy —O—$R^3$, preferably a $C_1$-$C_4$ alkoxy, acyloxy —O—C(O)$R^4$ wherein $R^4$ is an alkyl radical, preferably $C_1$-$C_6$, preferably methyle ou ethyle, halogens such as Cl, Br et I or trimethylsiloxy $(CH_3)_3SiO—$, and combinations of these groups. Preferably X groups are alkoxy groups, more preferably methoxy or ethoxy groups and better ethoxy groups.

The Y group, present when m is not equal to 0, is preferably a hydrocarbon group, saturated or not, more preferably a $C_1$-$C_{10}$ group and better a $C_1$-$C_4$ group, for example an alkyl group, such as methyl and ethyl, a vinyl group, an aryl group, for example phenyl, optionally substituted, for example by alkyle groups such $C_1$-$C_4$ alkyl. Preferably Y represents a methyl group.

According to a preferred embodiment of the invention, the compound of formula I' comprises a trialkjoxysilyl group such as triethoxysilyl ou trimethoxysilyl.

Preferably, the polyoxyalkylene group of the organosilane compound (R1 group) comprises less than 80 carbon atoms, more preferably less than 60

As examples of compounds of formula I, one can cite 2-[methoxy(polyethyleneoxy)propyl]trimethoxysilanes of formula $CH_3O—(CH_2CH_2O)_{6-9}—(CH_2)_3Si(OCH_3)_3$ (II') and $CH_3O—(CH_2CH_2O)_{9-12}—(CH_2)_3Si(OCH_3)_3$ commercialised by Gelest, Inc. or ABCR, the compound of formula $CH_3O—(CH_2CH_2O)_3—(CH_2)_3Si(OCH_3)_3$ (IV'), the compounds of formula $CH_3O—(CH_2CH_2O)_n—(CH_2)_3Si(OC_2H_5)_3$ wherein n=21-24, the compounds 2-[methoxy(polyethyleneoxy)propyl]trichlorosilane, 2-[acetoxy(polyethyleneoxy)propyl]trimethoxysilane of formula $CH_3C(O)O—(CH_2CH_2O)_{6-9}—(CH_2)_3Si(OCH_3)_3$, 2-[acetoxy(polyethyleneoxy)propyl]triethoxysilane of formula $CH_3C(O)O—(CH_2CH_2O)_{6-9}—(CH_2)_3Si(OC_2H_5)_3$, 2-[hydroxy(polyethyleneoxy)propyl]trimethoxysilane of formula $HO—(CH_2CH_2O)_{6-9}—(CH_2)_3Si(OCH_3)_3$, 2-[hydroxy(polyethyleneoxy)propyl]triethoxysilane of formula $HO—(CH_2CH_2O)_{6-9}—(CH_2)_3Si(OC_2H_5)_3$, compounds of formulae $HO—(CH_2CH_2O)_{8-12}—(CH_2)_3Si(OCH_3)_3$ et $HO—(CH_2CH_2O)_{8-12}—(CH_2)_3Si(OC_2H_5)_3$, polypropylene-bis[(3-methyldimethoxysilyl)propyl]oxide, and compounds with two siloxane heads such as compounds (V'), (VI') or (VII'):

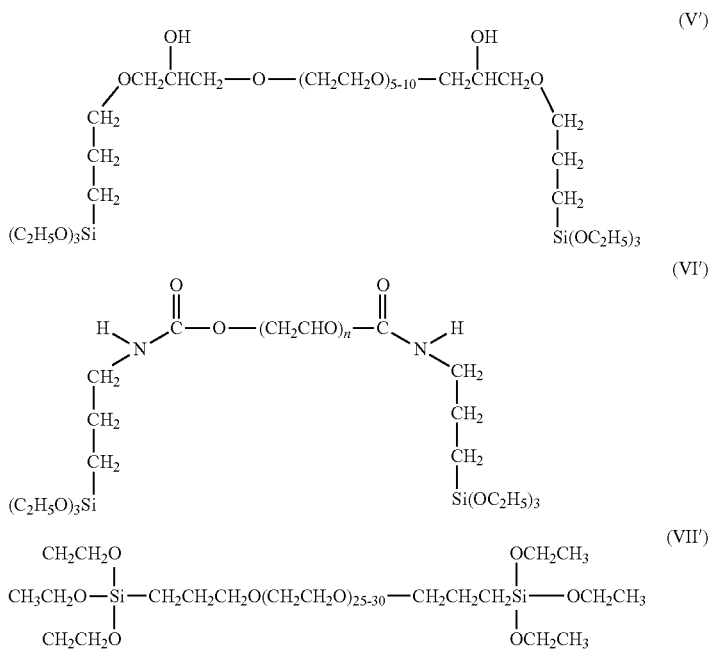

Preferably, the molecular weight of the organosilane compound of the invention ranges from 400 to 4000 g/mol, more preferably from 400 to 1500 g/mol, better 400 to 1200 g/mol, and ideally from 400 to 1000 g/mol.

When the grafting is implemented in gaseous phase, for example by evaporation under vacuum, the grafting can be followed, if necessary, by an elimination step of an excess of the organosilane compound, in order to keep only the organosilane compounds that are actually grafted at the surface of the second inorganic coating. The non grafted molecules are then removed. Generally, such an elimination step is implemented when the thickness of the hydrophilic coating is higher than 5 nm.

The elimination of excess of the organosilane compound is implemented by rinsing and wiping (liquid way) by using soapy water and/or wiping.

Preferably, the elimination is made by rinsing, followed by dry wiping. A final rinsing in deionized water is implemented, followed by a wiping with a cloth impregnated by an alcohol such as isopropyl alcohol.

A temporary antifogging layer can be obtained by depositing a film of a liquid solution containing a tensio-active agent at the surface of the hydrophilic coating.

The liquid solution containing a tensio-active agent can be applied by depositing at least one drop of said solution and then spread it on the surface of the optical article using a cloth. The tensio-active solution is generally an aqueous solution comprising 0.5 to 10%, preferably, 2 to 8% by weight of tensio-active agent. Preferably, one uses a tensio-active agent comprising poly(oxyalkylene) groups.

According to a specific embodiment, an antifouling hydrophobic top coat may be deposited onto said second inorganic layer.

The embodiment corresponding to a hydrophobic outermost layer is now to be disclosed in details.

The outermost layers also defined as anti-fouling layers preferably used in this invention are those which reduce surface energy of the article to less than 20 mJ/m$^2$. The invention has a particular interest when using anti-fouling top coats having a surface energy of less than 14 mJ/m$^2$ and even better less than 12 mJ/m$^2$.

The surface energy values referred above are calculated according to Owens Wendt method, described in the following document: Owens, D. K.; Wendt, R. G. "Estimation of the surface force energy of polymers", J. Appl. Polym. Sci. 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer. A preferred anti-fouling top coat is made from a liquid coating material comprising at least one fluorinated compound.

Hydrophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in U.S. Pat. No. 4,410,563, EP 0203730, EP 749021, EP 844265 and EP 933377.

A classical method to form an anti-fouling top coat consists in depositing compounds bearing fluorinated groups and Si—R groups, R representing an —OH group or a precursor thereof, such as —Cl, —NH$_2$, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarcarbons, perfluorocarbons, fluorinated polyethers such as $F_3C$—$(OC_3F_6)_{24}$—O—$(CF_2)_2$—$(CH_2)_2$—O—$CH_2$—Si$(OCH_3)_3$ and perfluoropolyethers, in particular perfluoropolyethers.

Among fluorosilanes there may be cited the compounds of formulae:

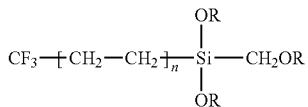

wherein n=5, 7, 9 or 11 and R is an alkyl group, typically a $C_1$-$C_{10}$ alkyl group such as methyl, ethyl and propyl;

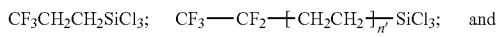

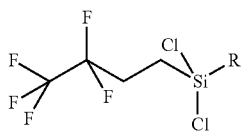

wherein n'=7 or 9 and R is as defined above.

Compositions containing fluorosilanes compounds also useful for making hydrophobic and/or oleophobic top coats are disclosed in U.S. Pat. No. 6,183,872. Such compositions comprise silicon-containing organic fluoropolymers represented by the below general formula and having a number average molecular weight of from $5 \times 10^2$ to $1 \times 10^5$.

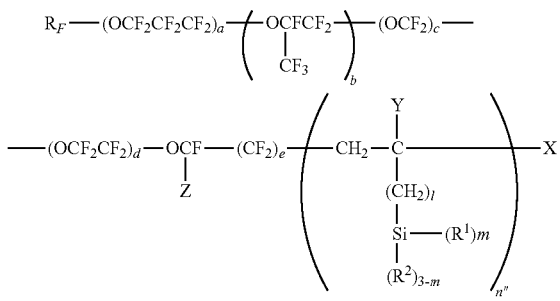

wherein $R_F$ represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; $R^1$ represents a hydroxyl group or a hydrolyzable substituent group; $R^1$ represents a hydroxyl group or a hydrolysable substituent group; $R^2$ represents a hydrogen atom or a monovalent hydrocarbon group; I represents 0, 1 or 2; m represents 1, 2 or 3; and n" represents an integer equal to or higher than 1, preferably equal to or higher than 2.

Other preferred compositions for forming the hydrophobic surface coating are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

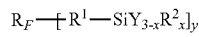

wherein $R_F$ is a monovalent or divalent polyfluoro polyether group; $R^2$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a molecular weight (number average) of at least about 1000. Preferably, Y is a lower alkoxy group and $R_F$ is a perfluoro polyether group.

Commercial compositions for making anti-fouling top coats are the compositions KY130 and KP 801M commercialized by Shin-Etsu Chemical and the composition OPTOOL DSX (a fluorine-based resin comprising perfluoropropylene moieties) commercialized by Daikin Industries.

OPTOOL DSX is the most preferred coating material for anti-fouling top coats.

The liquid coating material for forming the anti-fouling top coat of the invention may comprise one or more of the above cited compounds. Preferably, such compounds or mixtures of compounds are liquid or can be rendered liquid by heating, thus being in a suitable state for deposition.

The deposition techniques for such anti-fouling top coats are very diverse, including liquid phase deposition such as dip coating, spin coating (centrifugation), spray coating, or vapor phase deposition (vacuum evaporation).

In the context of the present invention, vacuum evaporation is preferred.

If the anti-fouling top coat is applied under a liquid form, at least one solvent is added to the coating material so as to prepare a liquid coating solution with a concentration and viscosity suitable for coating. Deposition is followed by curing.

The deposited anti-fouling top coat has preferably a physical thickness lower than 15 nm, more preferably ranging from 1 to 10 nm, even better ranging from 1 to 5 nm. Control of the deposited thickness can be performed by means of a quartz scale.

The anti-fouling top coat used herein may be used to improve dirty mark resistance of the finished article, which is particularly useful for optical articles. Reducing the surface energy avoids the adhesion of fatty deposits, such as fingerprints, sebum, sweat, cosmetics, which are thus easier to remove.

Besides, the final optical articles preferably do not absorb light in the visible range (or little), which means herein that when coated on one side according to the inventive process, the optical article has a luminous absorption in the visible range due to the coatings of preferably 1% or less, more preferably less than 1%, and/or a relative light transmission factor in the visible spectrum, Tv, preferably higher than 90%, more preferably higher than 95%, and even more preferably higher than 96%. Preferably, both features are simultaneously satisfied and can be reached by carefully controlling thicknesses of the coatings.

As used herein, the Tv factor is such as defined in the standard NF EN 1836 and corresponds to the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.5%, and more preferably less than 0.3%.

The invention provides many advantages.

The invention allows, by using a simple method, to improve the abrasion resistance properties of an optical article already coated with an abrasion resistant coating.

There is consequently no need to intrinsically modify the composition of the abrasion resistant coating.

The method of the invention allows getting either abrasion resistant hydrophilic optical articles, leading to antifogging optical articles, or abrasion resistant hydrophobic optical articles having anti-smudge properties. All these properties are particularly useful in the industry of spectacle lenses.

Now, the present invention will be described in more detail with reference to the following examples. These examples are provided only for illustrating the present invention and should not be construed as limiting the scope and spirit of the present invention The following test procedures were used to evaluate the optical articles prepared according to the present invention.

a) Haze Value and Tv

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturers instructions. Next, the sample was placed on the transmission light beam of the pre-calibrated meter and the haze value was recorded from three different specimen locations and averaged. Tv was measured using the same device.

"Luminous transmittance" or "relative light transmission factor in the visible spectrum" Tv (or $\zeta v$) is also defined in the standard ISO 13666:1998 and is measured according to the standard ISO 8980-3 (from 380 to 780 nm).

b) BAYER Sand Test

Determining such a BAYER value was conducted in accordance with the ASTM Standard F 735.81. The higher the BAYER test value the stronger the abrasion resistance is.

This test consists in simultaneously stirring a glass sample and a glass specimen with an alternating movement in a tank comprising an abrasive powder (sand) with a defined particle size at a frequency of 100 cycles/minute during 2 minutes. The H diffusion measurement "before/after" of a glass sample was compared to that of a glass specimen, here a CR-39(R)-based bare glass for which the BAYER value was fixed to 1. The BAYER sand value corresponds to R=H glass specimen/H glass sample.

c) Bayer Abrasion Test (with Alumine) (Will be Referred as ISTM Bayer):

Bayer abrasion resistance is determined by measuring the percent haze of a coated and uncoated lens, before and after testing on an oscillating sand abrader as in ASTM F 735-81, with the following modifications: the abrader is oscillated for 300 cycles with approximately 500 g of aluminum oxide (Al2O3) ZF 152412 supplied by Specially Ceramic Grains (former Norton Materials) New Bond Street, PO Box 15137 Worcester, Mass. 01615-00137. The haze is measured using a Pacific Scientific Hazemeter model XL-211. The ratio of the uncoated lens haze (final-initial) is a measure of the performance of the coating, with a higher ratio meaning a higher abrasion resistance.

d) The qualitative test known as the "n*10 blow" test makes it possible to evaluate the adhesion properties of a film deposited onto a substrate, in particular the adhesion of an antireflection coating to a substrate of an ophthalmic lens. Here it is applied to evaluate the adhesion of the two inorganic based layers applied on the abrasion resistant coating.

It was conducted on the lens convex face in accordance with the procedure described in the world patent application WO 99/49097 using a number of strains equal to 50.

A stress (or cycle) consists in moving 10 times the eraser in a back and fro motion. The operator did visually check the condition of the examined lens every 3 stresses and up to 12 stresses, then every 20, 30, 40 and 50 stresses. The evaluation relies on the number of stresses the lens can bear until a defect appears. Therefore, the higher the obtained value for the n*10 blow test, the stronger the adhesion of the antireflection coating to the substrate is.

e) Thickness of the films was evaluated by ellipsometer.

EXAMPLES

General Procedures

1) Preparation of the Abrasion Resistant Coated Lenses (Also Designated as Hard Coated Lenses).

Optical articles employed in the examples comprise a substrate ORMA® ESSILOR plano lens (6 base) having a 65 mm diameter, a thickness of 1.2 mm, coated on both faces with an impact resistant primer having a thickness of around 1 micrometer based on a W234 latex composition, and deposited thereon, an abrasion-resistant and/or an antiscratch coating (hard coat) disclosed in example 3 of the patent EP 0614957 (refractive index 1.50), based on a hydrolysate of GLYMO (gamma-glycidoxypropyl trimethoxysilane) and DMDES (dimethyldiethoxysilane), of colloidal silica and aluminum acetyl acetonate.

The abrasion-resistant coating was obtained by depositing and curing of a composition comprising by weight, 224 parts of GLYMO, 80.5 parts of HCl 0.1 N, 120 parts of DMDES, 718 parts of a 30 weight % colloidal silica in methanol, 15 parts of aluminum acetyl acetonate and 44 parts of ethylcellosolve. The composition also comprised 0.1% of the surfactant FLUORAD™ FC-430(R) (3M) by weight as related to the total weight de the composition. This abrasion-resistant coating was deposited directly onto the substrate.

2) Deposition of a First Inorganic Layer Comprising $SiO_2$.

A Satis 1200 DLF vacuum coater equipped with a Mark II Ion gun is used for the deposition of inorganic layers.

After positioning the lens in the vacuum chamber, the vacuum is made up to a pressure of $3.5 \cdot 10^{-3}$ Pa (Pascal) ($3.5 \cdot 10^{-5}$ mbar).

Then an ion gun pretreatment using Argon ions is implemented (3 A-150 V) on the surface of the lens during around 60 seconds and stopped.

Then the following component, placed in a crucible, is evaporated using an electron beam:
Manufacturer: OPTRON
Composition: $SiO_2$
Material shape: granulate size between 1 and 2 mm
and deposited on the abrasion resistant layer.
During the deposition, oxygen ($O_2$) is introduced in the vacuum chamber so that the resulting pressure inside the chamber during the deposition step is $1.3 \cdot 10^{-2}$ Pa ($1.3 \cdot 10^{-4}$ mbar) deposited at a rate of 0.35 nm/s.

3)—Deposition of Second Inorganic Layer Comprising SiO2

Then the following component, placed in a crucible, is evaporated using an electron beam:
Manufacturer: OPTRON
Composition: $SiO_2$
Material shape: granulate size between 1 and 2 mm During deposition, no additional gas (especially no $O_2$) is supplied in the vacuum coater and no ionic assistance is performed.

The pressure is $2.5\ 10^{-5}$ mbar. The deposition rate is 0.8 nm/s.

4) Deposition of the Hydrophilic Layer

The following material (named SIPEO) is evaporated:
$CH_3O—(CH_2CH_2O)_{6-9}—(CH_2)_3Si(OCH_3)_3$ The material is put in a copper capsule and the capsule is positioned in the middle of a tantalum evaporation boat.

Around 12 nm of SIPEO (excess of SIPEO) is evaporated by Joule effect.

Then, the lens is wiped with soapy water using a sponge. It is rinsed with deionized water and then wiped with a cloth impregnated with IPA (Isopropyl alcohol).

5) Deposition of the Hydrophobic Layer.

The hydrophobic material which is evaporated is Optool DSX. from Daikin.

The DSX is positioned in a copper capsule and the capsule is positioned in the middle of a tantalum evaporation boat and evaporated by Joule effect. The pressure during evaporation is $2.5\ 10^{-5}$ mbar.

Several examples are made at different thicknesses for the inorganic layers.

3 lens samples are made for each example.

The evaluation of the examples is reported in the following two tables. For the abrasion resistance, haze and transmittance, the mentioned value is the average of the results of the 3 samples. For the adhesion test (N10 blows), if all the samples did not give a result of more than 50, the results of the 3 samples were detailed.

TABLE 1

| Example | Substrate | 1st layer $SiO_2$ applied with $O_2$ pressure $PO_2$: $1.3 \times 10^{-4}$ mbar | 2nd layer $SiO_2$ no $PO_2$ | Third layer (outermost layer) | (Abrasion) Sand Bayer | Adhesion N 10 blows |
|---|---|---|---|---|---|---|
| 1 | Hard coated lens 1) | 20 nm | 80 nm | None | 5.06 | >50 |
| 2 | Hard coated lens 1) | 10 nm | 90 nm | None | 5.01 | >50 |
| 3 | Hard coated lens 1) | 20 nm | 150 nm | None | 5.52 | >50 |
| 4 | Hard coated lens 1) | 20 nm | 80 nm | DSX (Hydrophobic top coat) | 9.56 | >50 |
| 5 (Comparative) | Hard coated lens 1) | None | 100 nm | None | 5.51 | Loss of adhesion (1 = 20; 2 = 12) |
| 6 Comparative) | Hard coated lens 1) | 100 nm | None | None | 4.18 | >50 |
| 7 (comparative) | Hard coated lens 1) | 5 nm | 95 nm | None | 6.08 | Loss of adhesion 1 = 20; 1 = 40; 1 = 50 |
| 8 (comparative) | Hard coated lens 1) | 20 nm | 20 nm | None | 3.26 | >50 |
| 9 (comparative) | Hard coated lens 1) | 20 nm | 50 nm | None | 3.92 | >50 |

TABLE 2

| Example | Substrate | 1st layer $SiO_2$ applied with $PO_2$: $1.3 \times 10^{-4}$ mbar | 2nd layer $SiO_2$ no $PO_2$ | Third layer (outermost layer) | Abrasion ISTM Bayer Or Sand(*) Bayer | Haze | Transmittance | Adhesion Nx 10 blows |
|---|---|---|---|---|---|---|---|---|
| 10 (comparative) | Hard coated lens 1) | None | None | SiPEO 2-5 nm | 4.91 | 0.21 | 92.6 | OK |
| 11 (comparative) | Hard coated lens 1) | None | 20 nm | SiPEO 2-5 nm | 4.34 | 0.21 | 92.7 | Not OK |
| 12 (comparative) | Hard coated lens 1) | None | None | None | 4.5 4.21* | 0.11 | 92.7 | OK |
| 13 | Hard coated lens 1) | 20 nm | 80 nm | SiPEO 2-5 nm | 9.65 | 0.11 | 92.7 | OK |

Based on the above results, and taking example 12 (Hard coat lens 1)) as a reference, it clearly appears that the deposition of an inorganic silica layer on an abrasion resistant lens does not necessarily lead to an increase of mechanical properties (comparative examples 5 and 6: no abrasion resistance improvement or no adhesion). Moreover, if there is not an appropriate selection of pressure deposition conditions and thicknesses of the two inorganic layers, there is a decrease of abrasion resistance or problems of adhesion (Comparative examples 7, 8 and 9).

Examples according to the invention 1 to 3 exhibit significant improvement of Sand Bayer Value higher than 5.

Finally, the deposition of a hydrophobic or hydrophilic layer on the silica bilayer of examples 4 and 13 leads to a very high improvement of the Sand Bayer and ISTM Bayer.

The deposition of a hydrophilic layer on the abrasion resistant without the silica bilayer of the examples does not lead to an ISTM Bayer higher than 5.

The invention claimed is:

1. A method for preparing an abrasion resistant optical article comprising:
    a) providing an optical article having at least one main face bearing an abrasion resistant coating;
    b) positioning said optical article in a vacuum deposition chamber;
    c) depositing a first inorganic layer comprising $SiO_2$ onto and in direct contact with said abrasion resistant coating by vacuum evaporation of $SiO_2$ and/or $SiO_x$, with $1 \leq x < 2$, in said vacuum chamber, the thickness of said first inorganic layer ranging from 10 to 100 nm, wherein oxygen is introduced inside said vacuum chamber during said evaporation; said deposition being conducted without ion assistance;
    d) depositing a second inorganic layer comprising $SiO_2$ onto and in direct contact with said first inorganic layer by vacuum evaporation of $SiO_2$ and/or $SiO_x$, with $1 \leq x < 2$, in said vacuum chamber, the thickness of said second inorganic layer ranging from 70 to 300 nm, wherein said deposition is conducted without ion assistance and the pressure in said vacuum chamber during the deposition of said second inorganic layer being lower than the pressure during evaporation of said first inorganic layer and optionally
    e) applying onto and in direct contact with said second inorganic layer a hydrophilic or an antifouling hydrophobic layer, preferably having a thickness ranging from 1 to 15 nm;
    wherein the outermost layer of the article is said second inorganic layer, or, when present, said hydrophilic or hydrophobic layer.

2. The method according to claim 1, wherein the thickness of the first inorganic layer ranges from 10 to 30 nm and the thickness of the second inorganic layer ranges from 70 to 150 nm.

3. The method according to claim 1, further comprising:
    e) applying onto and in direct contact with said second inorganic layer a hydrophilic or hydrophobic layer having a thickness ranging from 1 to 15 nm.

4. The method according to claim 1, wherein the pressure inside said vacuum chamber during step c) is higher than or equal to $1 \times 10^{-4}$ mbar.

5. The method according to claim 4, wherein the pressure inside said vacuum chamber during step c) ranges from $1.2 \times 10^{-4}$ mbar to $5 \times 10^{-4}$ mbar.

6. The method according to claim 1, wherein the pressure inside said vacuum chamber during step d) ranges from $0.2 \times 10^{-4}$ to $0.5 \times 10^{-4}$ mbar.

7. The method according to claim 1, further comprising:
    e) applying onto and in direct contact with said second inorganic layer a hydrophilic layer having a thickness ranging from 1 to 15 nm.

8. The method according to claim 7, wherein said hydrophilic layer is applied by grafting of at least one organosilane compound having:
    at least one polyoxyalkylene group, preferably comprising less than 80 carbon atoms; and
    at least one Si atom bearing at least one hydrolysable group.

9. An abrasion resistant optical article obtained by a method according to claim 1.

* * * * *